L. S. ROSENER.
WEIGHING AND TRANSFERRING APPARATUS.
APPLICATION FILED DEC. 11, 1919.
1,370,226.
Patented Mar. 1, 1921.
2 SHEETS—SHEET 1.
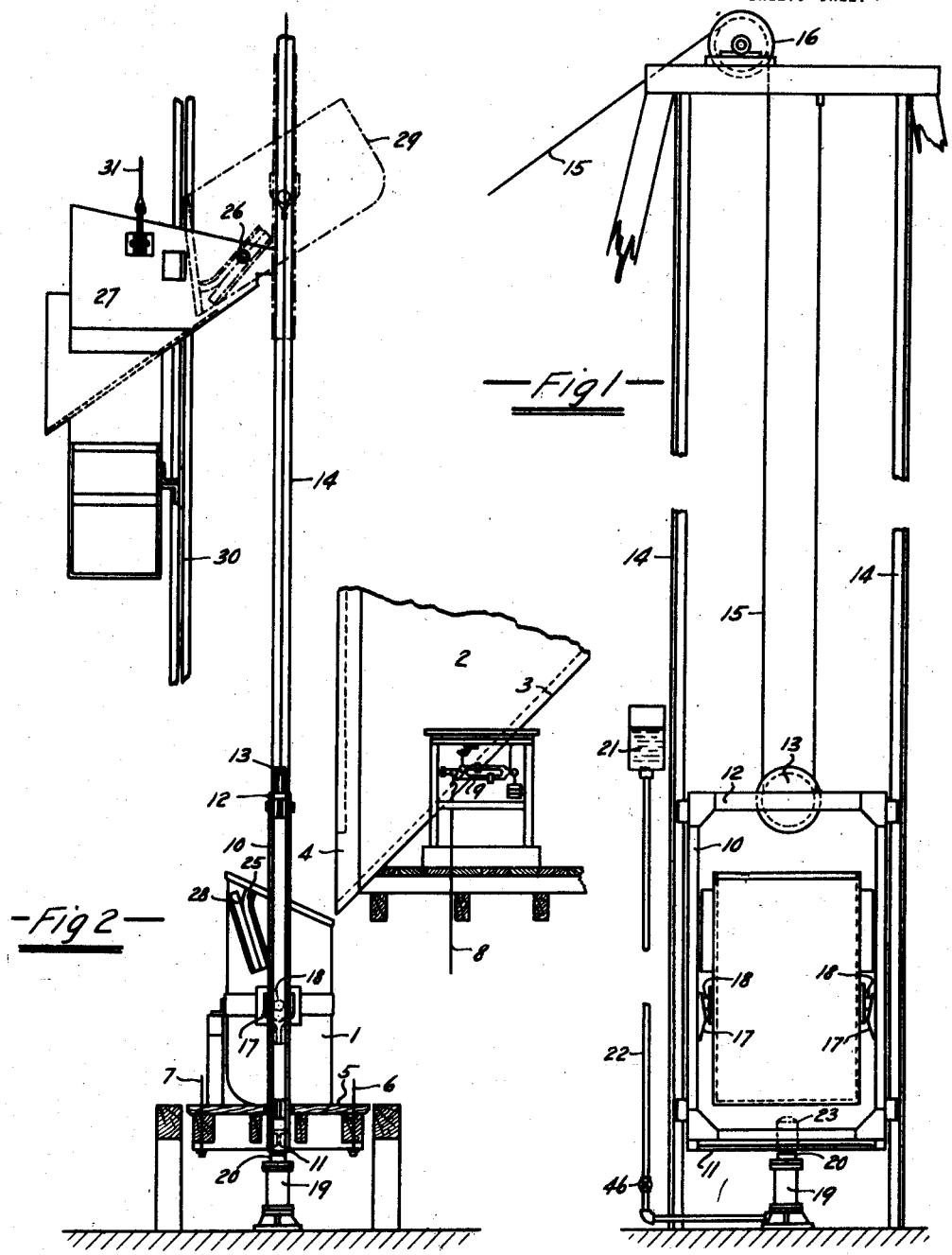

L. S. ROSENER.
WEIGHING AND TRANSFERRING APPARATUS.
APPLICATION FILED DEC. 11, 1919.

1,370,226.

Patented Mar. 1, 1921.
2 SHEETS—SHEET 2.

INVENTOR
Leland S. Rosener
BY John H Miller
Geo J Drury
ATTORNEYS

UNITED STATES PATENT OFFICE.

LELAND S. ROSENER, OF SAN FRANCISCO, CALIFORNIA.

WEIGHING AND TRANSFERRING APPARATUS.

1,370,226.  Specification of Letters Patent.  Patented Mar. 1, 1921.

Application filed December 11, 1919. Serial No. 344,258.

*To all whom it may concern:*

Be it known that I, LELAND S. ROSENER, a citizen of the United States, and a resident of the city and county of San Francisco, State of California, have invented new and useful Improvements in Weighing and Transferring Apparatus, of which the following is a specification.

My invention has for its object the easy weighing of unit loads in process of transfer, such as occur in the transfer of coal from barges to bunkers, and is particularly applicable to barges having bunker space therein, such as are employed in the handling of coal in harbors and in the weighing and transferring of such coal, and the operation of ship coaling, although other useful applications and adaptations of my invention will be clear from the description and drawings which follow.

Figure 1 indicates a front view of the transferring skip with its carrier frame, elevator ways, and means for receiving the carrier frame in its depressed position to prevent damaging impact with the weighing mechanism.

Fig. 2 is a part view and part section at right angles to Fig. 1, and showing the weighing apparatus.

Throughout the figures the same numerals refer to similar parts.

Figure 3:
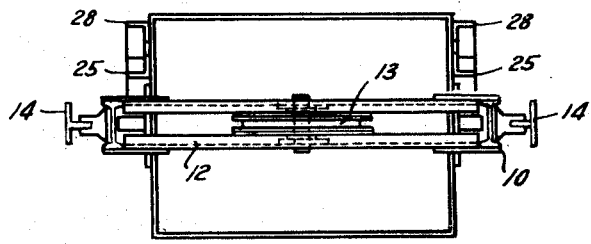
Fig. 3 is a plan view of Fig. 1.

In the figures my invention is indicated as applied to apparatus as for the coaling of ships, or for the transferring of coal from barges to ships, or other bunkers.

Numeral 1 indicates the skip into which unit loads of material may be received from the receiving hopper 2, in which hopper the material descends under the action of gravity on the sloping floor 3, and passes through the outlet 4, falling thence into the open-topped skip 1. The skip 1 in the lowest position, as shown in Fig. 1 and Fig. 2, rests upon the scale platform 5, and is connected by rods, as 6, 7, through lever mechanism, not shown, but well known, to the scale rod 8, and thence to the scale beam 9, by which the load on the platform 5 may be weighed.

In the position shown in Fig. 2, the skip is entirely free from its frame and attendant structure, so that the weight of the said skip and its load only, will be indicated on the beam 9.

The carrier frame 10 I prefer to form with a bottom section 11, and a top cross member 12, the latter carrying the sheave or other cable connecting means 13, so that the skip may be operated in vertical elevator ways 14, 14, by the cable 15, actuated over the top sheave 16, and thence to any suitable operating mechanism not shown, but well known.

Through the action of the rope 15 the frame 10 may be raised and lowered, and when it is in the position shown in Fig. 2, the first effect will be that of bringing the Y supports 17, 17 into engagement with the trunnion pins 18, 18, and thereafter the skip will be raised by the said cable. The object of the separation between the Y supports and the trunnion pins in the depressed position indicated in Fig. 2, is so that the frame will, when it descends, and after the skip 1 rests upon the weighing platform 5, free the Y supports from the said trunnions so that the skip and its contents may be weighed entirely free from any attendant structure.

The operation of the skip 1 by cable 15 is, in practice, done quite rapidly so that the frame 10 rapidly descends. I therefore provide a cushion means, which I have shown in Figs. 1 and 2, and which consists of a cylinder 19 within which operates the piston 20 under the action of the fluid pressure from the reservoir 21, valve 46, and connecting pipe 22, and which presses upon the under side of the piston 20, raising it when free to an elevated position 23, so that as the frame 10 descends, it impinges first upon the extended piston end 23. The rapid motion of the descending frame is then arrested, although the cable 15 may be slack, and the frame with its still contained skip 1 will descend slowly as it forces said fluid by valve 46, until the skip arrives upon, and thereafter rests easily, on the weighing platform 5, after which the frame 10, due to its weight, causes the piston to further descend to its final position, as shown in Fig. 2. The frame has now descended below the skip, releasing the Y supports 17, 17, so that they entirely clear the trunnions 18. The skip is now to be weighed with its contained load which weight will be indicated upon the scale beam 9.

In the reverse operation, when the cable 15 is actuated to raise the frame 10, the said frame immediately leaves the piston, the Y supports 17, 17, seize upon the trunnions, or pivots 18, 18, and raise the skip with any degree of rapidity desired.

Upon the raising of the skip 1 through the elevator ways 14, by the action of the cable 15, the track 25 will just clear the rollers 26, of discharge hopper 27, and the track 28 on the skip 1 will engage said rollers so that the skip will be caused to dump, turning at such time upon its trunnions 18, 18 in the Y supports 17, 17. The dumping operation will take place from the skip when in the dotted position indicated at 29.

Figure 4:
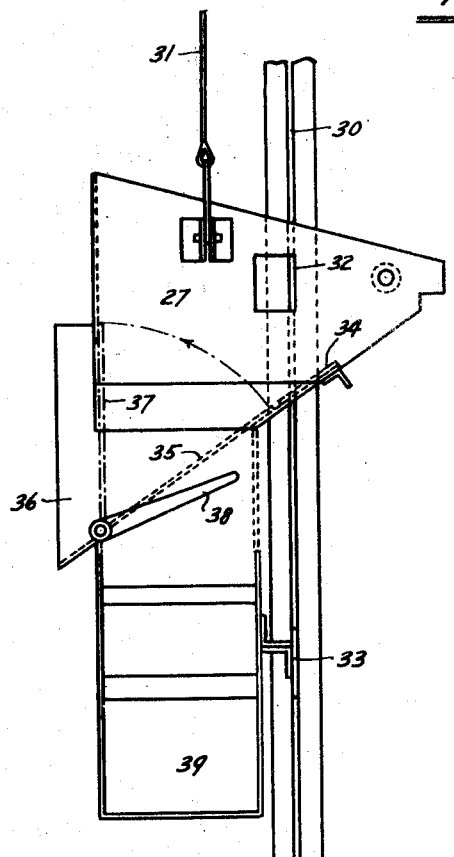
Fig. 4 is a side view of the discharge hopper.
Figure 5:
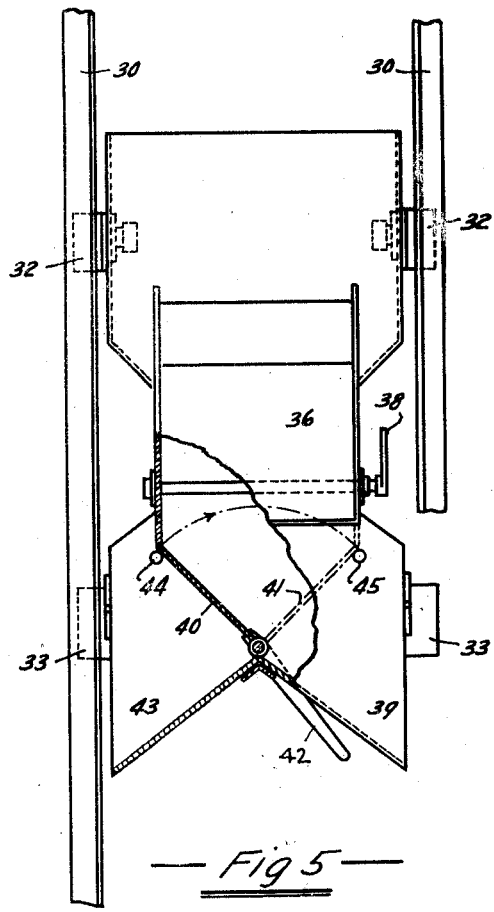
Fig. 5 is a view at right angles to Fig. 4, and shown partly in section.

Upon now permitting the cable 15 to descend, the track 25 on the side of the skip 1 will engage the rollers 26, turning the skip back into its vertical position, and permitting its free descent in the elevator ways 14. The hopper 27 may be constructed so as to direct the load dumped from the skip 1, when in the position 29, into a plurality of different paths as indicated in Figs. 4, 5. This hopper is preferably arranged to travel on tracks, or ways, as 30, and with which the sliding shoes as 32, 33, engage, and on which it may be actuated by the cable 31 and locked in any desired position by any well known means.

The load from the skip 29 is dumped upon the floor 34 of the hopper 27, and the said load will descend by gravity across the floor plate 35, and discharge through the outlet 36, or, the floor plate 35 may be raised into position 37 through the action of the lever 38, and the load passing from the floor 34 will fall through the opening thus provided, and there be diverted through the outlet 39 by the wing gate 40; or, if the wing gate 40 be moved into the position 41, through the action of the lever 42, the load will be diverted through the outlet 43. The wing gate 40 is adapted to normally rest on the stop 44, or the stop 45, depending upon whether the discharge is to occur through the outlet 39 or the outlet 43.

The position of the receiving hopper 2 with respect to the skip 1, at the time the skip is receiving its load, is such that material sliding on the inclined floor of the hopper is projected into the skip across the intervening clearance space. The skip is arranged to travel in its ways clear of the said hopper. If desired, a swinging apron may be employed in this intervening clearance space, but this is not ordinarily necessary. I have not shown such apron as it is well known.

It will thus be seen that with my apparatus the load originally received in the hopper 2 may be weighed while in transit, and as the unloading progresses, the unit loads then being transferred to an elevation from which a suitable gravity slide will occur into any of a plurality of directions. It will also be obvious that the receiving hopper 2 may, in effect, consist of a bunker having storage capacity and the opening 4 may be fitted with any well known form of gate, and the flow of the material may therefore be controlled into the skip 1, or unit loads may be dumped into the hopper 2, and, as such, directly transferred into the skip 1; they may then be weighed and transferred to the discharge hopper 27, and under the action of gravity transferred to any desired new location.

Reference is herein made to my co-pending application Serial No. 331,085, filed October 16, 1919, also my co-pending application Serial No. 344,259 filed Dec. 11, 1919, in which disclosures I have set forth further inventions.

I claim:

1. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed.

2. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, and means for cushioning the movement of the skip as it approaches the platform.

3. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, and means for cushioning the movement of the skip as it approaches the platform consisting of a piston and a cylinder, and fluid pressure in the cylinder normally retaining expansion between the piston and cylinder.

4. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, and means for cushioning the movement of the skip as it approaches the platform consisting of a piston and a cylinder, and fluid pressure in the cylinder normally retaining expansion between the piston and cylinder, until the skip has rested upon the platform and the frame has descended free of the pivot means, as and for the purposes set forth.

5. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, in combination with a hopper adjacent to said ways and into which the skip is adapted to discharge its load; and tripping means adapted to engage said skip to discharge into said hopper.

6. A skip pivotally mounted in a frame adapted to separate from the skip pivot means; ways in which the said frame is adapted to travel; means for raising and lowering the frame in the ways; a platform constructed and adapted to support the skip in its lowest position and permitting the frame to drop therebelow; scale mechanism connected to the said platform by which the skip and its load may be weighed and means for cushioning the movement of the skip as it approaches the platform, consisting of a piston and a cylinder and fluid pressure in the cylinder normally retaining expansion between the piston and cylinder, in combination with a hopper into which the skip is adapted to discharge its load; and tripping means adapted to engage said skip to discharge into said hopper, said hopper having ways parallel with said skip ways and being vertically adjustable thereon, as and for the purposes set forth.

7. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, and means for cushioning the movement of the skip as it approaches the platform, consisting of a piston and a cylinder and fluid pressure in the cylinder normally retaining expansion between the piston and cylinder and positioned to cause a pressure on the said fluid, until the skip has rested upon the platform and the frame has descended free of the pivot means, in combination with a hopper into which the skip is adapted to discharge its load; and tripping means adapted to engage said skip to discharge into said hopper, said hopper having ways parallel with said skip ways and being vertically adjustable thereon, as and for the purposes set forth.

8. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, in combination with a hopper into which the skip is adapted to discharge its load; and tripping means adapted to engage said skip to discharge into said hopper, said hopper having ways parallel with said skip ways and being vertically adjustable thereon.

9. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, in combination with a hopper into which the skip is adapted to discharge its load; and tripping means adapted to engage said skip to discharge into said hopper, said hopper provided with a plurality of discharge outlets, and controlling means therefor to direct the discharged load through any of said plurality of outlets.

10. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, and means for cushioning the movement of the skip as it approaches the platform, consisting of a piston and a cylinder and fluid pressure in the cylinder normally retaining expansion between the piston and cylinder, in combination with a hopper into which the skip is adapted to discharge its load; and tripping means adapted to engage said skip to discharge into said hopper, said hopper having ways parallel with said skip ways and being vertically adjustable thereon, said hopper provided with a plurality of discharge outlets and controlling means therefor to direct the discharged load through any of said plurality of outlets, as and for the purposes set forth.

11. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, and means for cushioning the movement of the skip as it approaches the platform, consisting of a piston and a cylinder and fluid pressure in the cylinder normally retaining expansion between the piston and cylinder, until the skip has rested upon the platform and the frame has descended free of the pivot means, in combination with a hopper into which the skip is adapted to discharge its load; and tripping means adapted to engage said skip to discharge into said hopper, ways for said hopper—parallel with said skip ways and on which said hopper is vertically adjustable, said hopper provided with a plurality of discharge outlets, and controlling means therefor to direct the discharged load through any of said plurality of outlets, as and for the purposes set forth.

12. A skip pivotally mounted in a frame; ways in which the said frame is adapted to travel; means for raising and lowering the frame in the ways; a platform constructed and adapted to support the skip in its lowest position and permitting the frame to drop therebelow, and at such time to separate from the skip pivot means; scale mechanism connected to the said platform by which the skip and its load may be weighed, in combination with a hopper into which the skip is adapted to discharge its load; and tripping means adapted to engage said skip to discharge into said hopper, said hopper having ways parallel with said skip ways and being vertically adjustable thereon, and provided with a plurality of discharge outlets, and controlling means therefor to direct the discharged load through any of said plurality of outlets.

13. In skip weighing mechanism, a receiving hopper positioned to discharge by gravity into a skip located below said hopper, but having a traveling clearance thereby, a carrier frame for said skip and ways in which said frame is adapted to travel, and weighing mechanism constructed and adapted to weigh said skip when loaded.

14. In skip weighing mechanism, a receiving hopper positioned to discharge by gravity into a skip located below said hopper, but having a traveling clearance thereby, a carrier frame for said skip and ways in which said frame is adapted to travel, and weighing mechanism constructed and adapted to weigh said skip when loaded, consisting of a platform positioned to receive and weigh said skip in its lowest position; means between said skip and said frame, by which the skip may be lifted when the frame is elevated, but will disengage from said skip when said frame is in its lowest position, in combination with said skip.

15. In skip weighing mechanism, a receiving hopper positioned to discharge by gravity into a skip located below said hopper, but having a traveling clearance thereby, a carrier frame for said skip and ways in which said frame is adapted to travel, and weighing mechanism constructed and adapted to weigh said skip when loaded, consisting of a platform positioned to receive and weigh said skip in its lowest position: means between said skip and said frame, by which the skip may be lifted when the frame is elevated, but will disengage from said skip when said frame is in its lowest position, and cushioning means by which the skip is eased on to the platform in its downward travel.

16. In skip weighing mechanism, a receiving hopper positioned to discharge by gravity into a skip located below said hopper, but having a traveling clearance thereby, a carrier frame for said skip and ways in which said frame is adapted to travel, and weighing mechanism constructed and adapted to weigh said skip when loaded, consisting of a platform positioned to receive and weigh said skip in its lowest position; means between said skip and said frame by which the skip may be lifted when the frame is elevated, but will disengage from said skip when said frame is in its lowest position, and ways in which the skip and the frame are adapted to travel, and cushioning means by which the skip is eased on to the platform in its downward travel and by which the frame may descend until the skip frame is cleared of said skip, substantially as and for the purpose set forth.

In testimony whereof I have hereunto set my hand at the city of San Francisco, California, this 4th day of December, 1919.

LELAND S. ROSENER.